(No Model.)

J. L. WILLFORD.
MECHANICAL MOVEMENT.

No. 315,202. Patented Apr. 7, 1885.

Witnesses
R. H. Sanford.
Jas. E. Wordford

Inventor
Joseph L. Willford
By A. C. Paul
His atty.

UNITED STATES PATENT OFFICE.

JOSEPH L. WILLFORD, OF MINNEAPOLIS, MINNESOTA.

MECHANICAL MOVEMENT.

SPECIFICATION forming part of Letters Patent No. 315,202, dated April 7, 1885.

Application filed February 2, 1885. (No model.)

*To all whom it may concern:*

Be it known that I, JOSEPH L. WILLFORD, a citizen of the United States, residing at Minneapolis, in the county of Hennepin and State of Minnesota, have invented certain new and useful Improvements in Belt-Gearing; and I do hereby declare the following to be a full, clear, and exact description of the invention, such as will enable others skilled in the art to which it appertains to make and use the same.

My invention relates to improvements in roll or shaft driving mechanism; and the invention consists, generally, in the construction, combination, and arrangement of parts hereinafter described, and particularly pointed out in the claims.

The objects I have in view are to provide a driving mechanism by which to drive, with open or uncrossed belts from a single driving or counter shaft, four other shafts or rolls, and to rotate the alternate rolls or shafts in opposite directions, so that each pair of said rolls will be turned in toward each other; also, to provide spring belt-tighteners for use with said drive.

Figure 1:
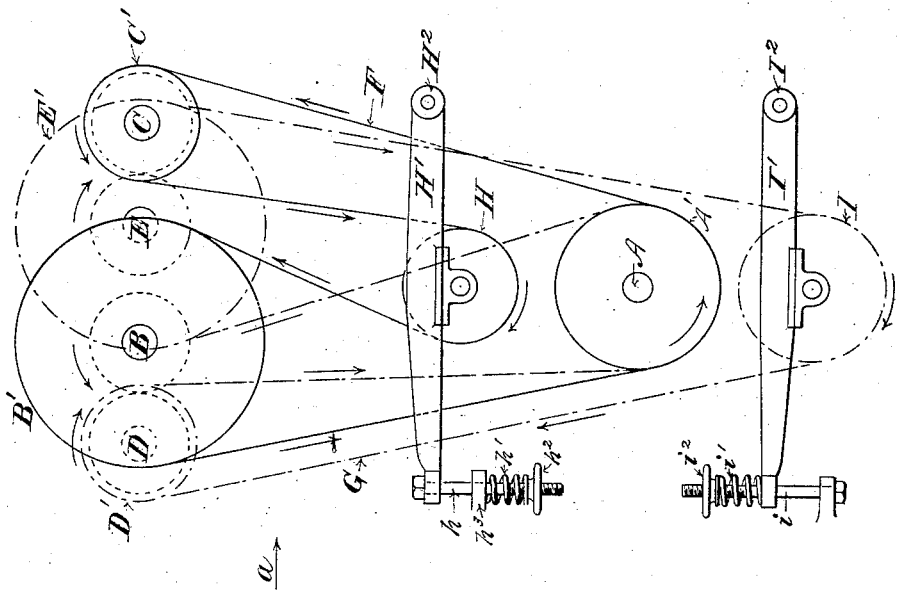
Figure 2:
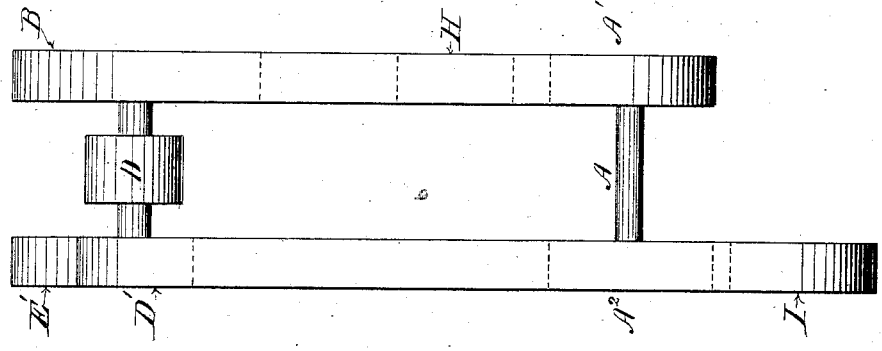
Figure 3:
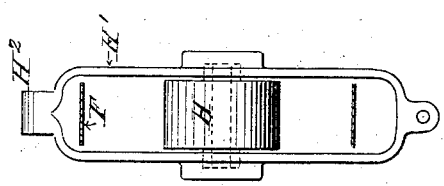

In the drawings, Figure 1 is a side elevation showing my improved drive, the farther belt being represented by dotted lines to prevent obscuring the drawings. Fig. 2 is an elevation, looking in the direction of arrow $a$ in Fig. 1. Fig. 3 is a plan of one of the tighteners. The tighteners, it will be observed, are omitted in Fig. 2.

A is a shaft, which is supported in any suitable bearings, is provided with a suitable driving-pulley, and receives power from any convenient motor. This counter-shaft is also provided with the two belt-pulleys A' and A², which are preferably of the same size.

D, B, E, and C represent four shafts or rolls, which are driven in the directions indicated by the arrows in Fig. 1—that is to say, the shafts D and B are turned in toward each other, and the shafts E and C are likewise turned in toward each other. The roll or shaft D is provided with the pulley D', the roll B is provided with pulley B', roll E is provided with pulley E', and roll C with pulley C'.

H is a belt-tightening pulley located over shaft A, and I is a belt-tightening pulley located under the shaft A. The pulleys B', C', A', and H are arranged in one vertical plane, as seen in Fig. 2, and the pulleys D', E', A², and I are arranged in a vertical plane. The open belt F passes under the pulley A', over the pulley B', under the tightener-pulley H, and over the pulley C', and the belt G passes under the pulley A², over the pulley D', under the tightener-pulley I, and over the pulley E'. The shaft A is rotated in the direction indicated by the arrow in Fig. 1, and the belts F and G travel in the direction of the arrows in the same figure. Thereby the belt F turns the pulleys B' and C', and consequently the shafts B and C, in the direction of the arrows in Fig. 1, and the belt G turns pulleys D' and E' and their shafts D and E in the direction of the arrows in Fig. 1. When it is desired to rotate one of the rolls of each pair at a greater speed than the other, it may be accomplished with this drive in the following manner: With the pulleys A' and A² of the same size, the pulleys B' and C' may differ in size, as shown, as may also the pulleys D' and E'. The belt F is passed over the pulley A², over the small pulley C', and over the large pulley B', and thus drives one fast roll and one slow roll, while the belt G, passing over the pulleys D' and E', similarly drives one fast roll and one slow roll. The fast roll C, driven by the belt F, tends to increase the speed of the contiguous slow roll E, over whose pulley E' the belt G passes. As roll C' acts upon roll E so as to tend to increase its speed, the belt G, acting on pulley E', tends to hold the roll back, and to allow it to travel only at the rate of speed that would be given to it by belt G if roll C did not act upon it, and at the same time roll C, through the roll E and pulley E', tends to increase the speed of the belt G and to aid it in driving pulley D' on roll D. The roll D similarly acts upon the slow roll B and belt F. I therefore obtain a differential speed of the rolls by two belts, each traveling at the same rate of speed, receiving the same power from the driving-shaft, and transmitting the same power to the rolls. This drive may be used wherever it is desired to secure the movement of rolls or shafts above set forth. The belt-tightener pulley H is journaled in the open lever H', which is pivoted at H² to any suitable support, and at its opposite end is provided with the threaded bolt $h$, which projects through the stationary lug $h^3$, and is surrounded by the spring $h'$, which is confined between lug $h^3$ and nut $h^2$. The pulley I is journaled in a similar pivoted lever, I', pivoted at I$^3$, and provided with bolt $i$, nut $i^2$, and spring $i'$. The lever-tighteners not only yield when the drive is started, and thus prevent all shocks and strains on the belts, but they also allow the belts to expand and contract, as they are sure to do from changes in the state of the atmosphere, and take up the slack occasioned by the stretching of the belts from continuous use.

I claim—

1. The driving mechanism consisting of a counter-shaft provided with belt-pulleys, four belt-pulleys carried by rolls located above said counter-shaft, an idler-pulley located above the counter-shaft, and another idler-pulley located below the counter-shaft, in combination with one open belt passing under one of the pulleys on the counter-shaft, over two of the roll-pulleys, and under the upper idler, and a second open belt passing under another pulley on the counter-shaft, over the other two roll-pulleys, and under the lower idler, substantially as described, and for the purpose set forth.

2. In combination with the shaft A, having pulleys A' and A$^2$, the rolls or shafts D B E C, provided, respectively, with pulleys D' B' E' C', the idlers H and I, and the belts F and G, the belt F being arranged under the pulley A', over the pulleys B' and C', and under the idler H, and the belt G being arranged under the pulley A$^2$, over the pulleys D' and E', and under the idler I, all substantially as described.

3. In combination with the shaft A, having pulleys A' and A$^2$, and the rolls or shafts D B E C, provided, respectively, with pulleys D' B' E' C', the idler H, located above shaft A, and mounted in the open spring-controlled lever H', the idler I, located below the shaft A, and mounted in the open spring-controlled lever I', and the belts F and G, the belt F passing under the pulley A', over the pulleys B' and C', and under the idler H, and the belt G passing under the pulley A$^2$, over the pulleys D' and E', and under the idler I, all substantially as described.

4. The belt-tightener consisting of an open pivoted lever, an idler-pulley journaled therein, a threaded bolt extending through the end of the lever and through a fixed stud, a spiral spring surrounding the bolt, and means for regulating the tension of the spring, substantially as described.

5. In combination with the shaft A, having the equal pulleys A' A$^2$, the rolls D B E C, provided, respectively, with the pulleys D' B' E' C', the pulleys B' and E' being of greater diameter than the pulleys D' and C', the belt-tighteners H and I, and the belts F and G, the belt F passing under pulley A', over pulleys B' and C', and under tightener H, and belt G passing under pulley A$^2$, over pulleys D' and E', and under tightener I, substantially as described.

6. The combination of the rolls D, B, E, and C, provided, respectively, with pulleys D', B', E', and C', said pulleys E' and B' being of greater diameter than pulleys D' and C', with the driving-belts, each arranged over one large and one small pulley, as and for the purpose set forth.

In testimony whereof I affix my signature in presence of two witnesses.

JOSEPH L. WILLFORD.

Witnesses:
ELECTUS A. PRATT,
A. C. PAUL.